United States Patent [19]

Kaczeus et al.

[11] Patent Number: 4,654,736
[45] Date of Patent: Mar. 31, 1987

[54] HELICAL BAND DRIVE FOR DISC STORAGE APPARATUS

[75] Inventors: Steven Kaczeus, Santa Cruz; Long V. Ngo, San Jose, both of Calif.

[73] Assignee: Seagate Technology, Scotts Valley, Calif.

[21] Appl. No.: 868,614

[22] Filed: May 29, 1986

Related U.S. Application Data

[63] Continuation of Ser. No. 595,894, Apr. 2, 1984, Pat. No. 4,614,989.

[51] Int. Cl.⁴ .......................... G11B 5/55; G11B 21/08
[52] U.S. Cl. ........................................ 360/106; 74/89.2
[58] Field of Search ................ 360/106, 109, 12-13, 360/313; 74/89.2, 108

[56] References Cited

U.S. PATENT DOCUMENTS 3,367,195 2/1968 Racine ................................. 74/89.2
4,456,937 6/1984 Iftikar et al. ........................ 360/106

FOREIGN PATENT DOCUMENTS 59-129973A 1/1983 Japan .

OTHER PUBLICATIONS

IBM/TDB, vol. 19, No. 7, Dec. 1976, pp. 2675-2677, "Dual-Band Access Mechanism" by Fournier.
IBM/TDB, vol. 21, No. 4, Sep. 1978, pp. 1598-1599, "Magnetic Head Band Access Mechanism" by Bailey et al.

Primary Examiner—John H. Wolff
Attorney, Agent, or Firm—Flehr, Hohbach, Test, Albritton & Herbert

[57] ABSTRACT

A disc drive includes a stepper drive motor for moving a carriage to any desired position relative to a disc. The drive motor rotates a shaft coupled to the carriage through parallel bands which are helically wound on the motor drive shaft. One band is wound on the shaft while the other is unwound. Thus the drive shaft can rotate through 360° or more.

5 Claims, 6 Drawing Figures

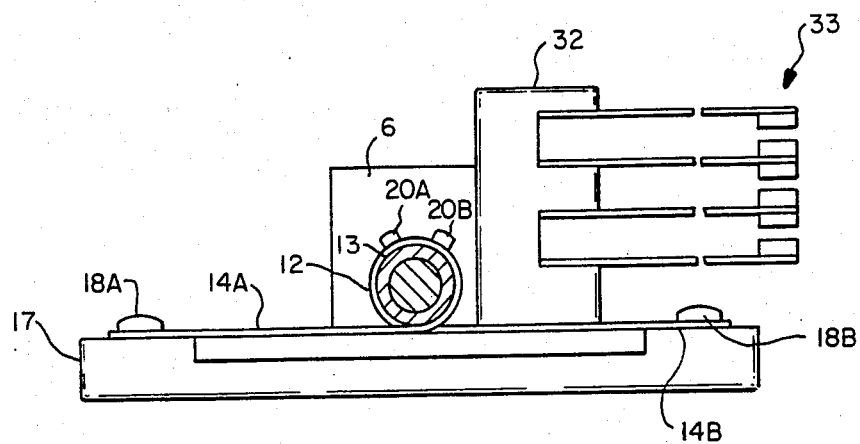
FIG.—1
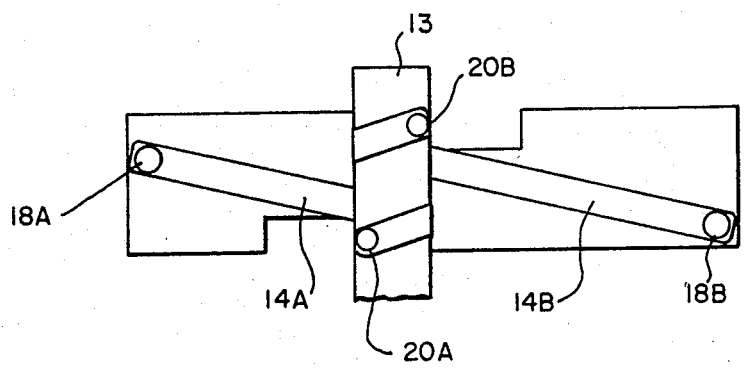
FIG.—2

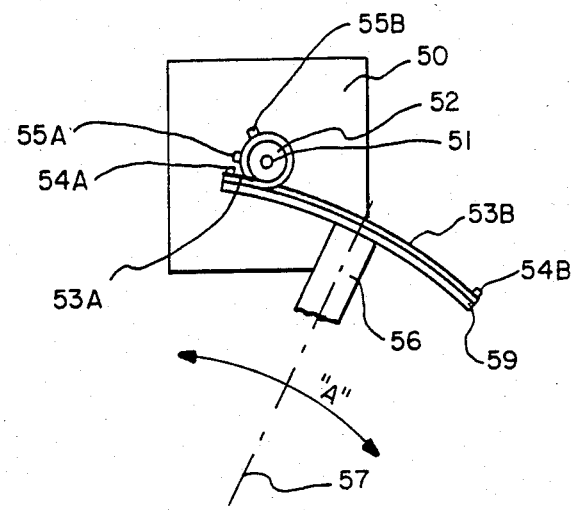
FIG.—3
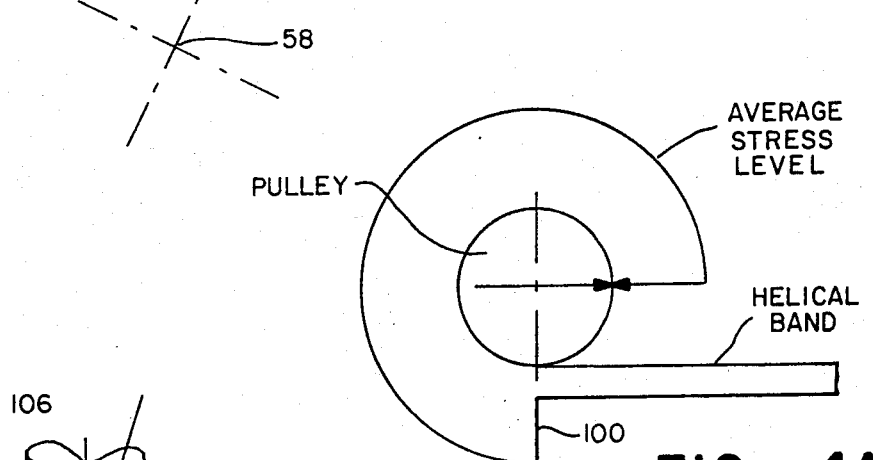
FIG.—4A
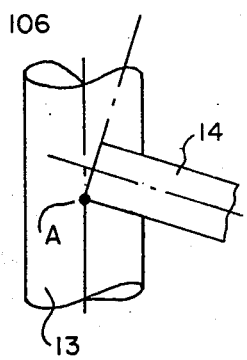
FIG.—4C
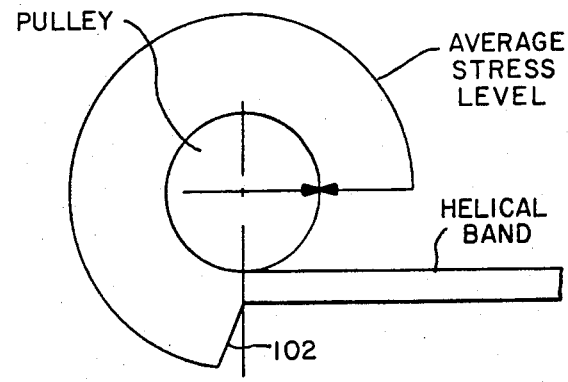
FIG.—4B

HELICAL BAND DRIVE FOR DISC STORAGE APPARATUS

This is a continuation of application Ser. No. 595,894 filed Apr. 2, 1984, now U.S. Pat. No. 4,614,989.

The subject invention relates generally to a head positioning assembly for disc drive apparatus and more particularly to an improved band drive for use in either a linear or rotary positioning assembly.

Disc drive machines record and reproduce information stored on concentric circular tracks on magnetic discs. Tracks are written and read by magnetic heads which cooperate with the surface of the disc. Various methods have been used to position the head; The two common types of data accessing mechanisms are linear and rotary head carriages. In both types, the objective is to position a magnetic head over a concentric track on the surface of a magnetic disc for reading or writing of information.

Various methods have been used to move the cams carriage and position the head including lead screws, and band drives. Band drives are shown and described in U.S. Pat. Nos. 3,881,139 and 4,161,004, and 4,170,146 among others. These drives convert rotary motion of a stepper motor shaft to motion of the carriage to move the heads mounted on the carriage radially across the disc to record and read adjacent concentric circular tracks. A typical drive band is wrapped around the motor shaft or a pulley attached to the shaft, and has its ends attached to the carriage so that rotation of the shaft wraps one portion of the band on the pulley while unwrapping the other, causing the carriage to move. A new track is recorded at each step of the stepper motor as it moves the head radially across the disc.

While band drives have proved to be the most popular form of drive, a long term problem with such drives has been that the total rotation of the motor shaft available to drive the head from the innermost track to the outermost track has been typically limited to less than one complete rotation of the shaft. This is because in the present split band technology, the band tied to the motor drive shaft and to one end of the carriage passes between the two portions of the band which are fastened to the drive shaft and to the other end of the carriage as the carriage is driven back and forth.

It is an object of the present invention to provide an improved band drive for converting the rotary motion of the motor to linear motion.

Another object of the present invention is to provide a band drive coupled to a stepper motor which allows for more than 360° rotation of the motor shaft.

Another object of this invention is to provide an improved band drive for use with a stepper motor in a disc drive type memory storage apparatus.

Another object of the present invention to provide a rotary head carriage configuration driven by a band drive.

A further objective of the present invention is to provide a band drive in which the band portions attached to each end of the carriage are helically wound on the drive shaft.

Another objective of the present invention is to provide a helically wound band drive, thereby increasing the number of tracks on a disc drive which may be accessed by increasing the number of steps a stepper motor may take in winding a band from one end of the carriage to the opposite end of the carriage.

In band driven disc drive actuators, the weak link is usually the band, because it is made of relatively thin material and is subjected to frequent near-instantaneous increases in stress as the motor starts and stops. Therefore an object of the invention is to provide a band drive design which reduces or eliminates instantaneous changes in stress on the band.

The above and other objects of the present invention are achieved by a drive mechanism including a stepper drive motor for moving a carriage or the like to any desired position between two extreme positions along a path of travel. The drive motor includes a rotatable shaft coupled to the carriage through a band which is helically wound on the motor drive shaft.

In a preferred embodiment of the present invention it is incorporated into a disc drive having a head positioning apparatus including a carriage which mounts a magnetic head for movement relative to a recording medium; drive means for moving the carriage including a drive motor having a rotatable shaft, the flexible band being helically wound on the shaft to move the carriage. The band is wound on the spindle in two portions, one portion being wound on the shaft while the other is unwound.

By providing a helically wound band, for the first time a stepper motor is allowed to make more than one complete revolution in moving a recording head from track to track in a disc drive, thereby increasing the number of tracks which may be addressed, or, depending on the application, increasing the spacing between the tracks if such is desirable.

The foregoing advantages and objectives of the invention can be more clearly understood from the following description taken in connection with the drawings in which:

FIG. 1 is a side elevational view of a typical linear drive carriage;

FIG. 2 is a plan view of a drive carriage and stepper motor shaft incorporating the helically wound band of the present invention;

FIG. 3 is a plan view of a rotary disc drive actuator which incorporates the present invention.

FIGS. 4A, 4B and 4C are schematic diagrams of the stress levels on split and helical bands.

The helically wound band of the present invention was designed to translate the rotary motion of a stepper motor drive shaft to a carriage or other driven object while providing two significant advantages:

1. increasing the number of steps through which the stepper motor can rotate; and
2. reducing the instantaneous changes in stress on the band.

These advantages can be more easily understood by considering the use of the band in one important environment i.e. to drive a head actuator in a disc drive.

In a U.S. Pat. No. 4,323,939 issued Apr. 16, 1982 and entitled "HARD FIXED DISC DRIVE ASSEMBLY AND READ/WRITE HEAD ACTUATOR" assigned to the assignee of this invention there is described a disc apparatus in which the present invention is useful. The disclosure of that patent is incorporated herein by reference.

FIG. 1 shows the basic elements of a disc drive head actuator including a stepper motor 6 having a drive shaft 12, a pulley 13 carried at the end of the drive shaft and adapted to receive a drive band 14. The band includes a first portion 14A and a second portion 14B each secured by a screw 18A 18B to a distant end of the carriage and by a screw or other fastener 20A 20B to the drive shaft. Rotation of the drive shaft 12 and pulley 13 clockwise or counterclockwise winds and unwinds the first and second band portions 14A, 14B on the pulley to move the carriage. The carriage includes cutout portions to allow the drive shaft securing screws to rotate past the plane of the carriage.

The carriage itself mounts an E-shaped or other suitable mount 32 for a plurality of heads 33 which are adapted to cooperate with one or more associated discs. By controlling the stepper motor, the carriage which in this embodiment is a linear carriage, moves linearly along a track to move the heads in and out on the surface of the associated disc to read and write information on the disc surface.

More particularly as clearly appears in FIG. 2, since the band portions 14A, 14B helically wind on non-overlapping portions of the pulley 13, the stepper motor is capable or more than one complete revolution. Therefore, the carriage can be moved a greater distance, allowing for an increased number of tracks to be defined. This is a highly significant advantage in a technology where increased data storage is of critical importance.

The reason for the control of stress in the band being particularly advantageous, is that this is one of the key points of breakdown in disc drives. Breaks do occur due to the instantaneous changes in stress on the band. It is also known that almost all breaks in the band material occur perpendicular to the cross section. Therefore, with a helical pulley, which has a larger effective radius, less stress is imposed on the cross section of the band. For example, FIG. 4A depicts the average stress level imposed on a normally wound split band as is now in common use, and particularly the instantaneous change in stress on the band at the point 100 where the band comes in contact with the pulley. In contrast, looking at FIG. 4B, it can be seen that as to any cross section of the band (see the line 106 in FIG. 4C identifying such a cross section) only one point on the cross sectional line reaches the pulley 13 at a time. Therefore, as can be seen from the line 102 of FIG. 4B, the change in stress imposed on any cross sectional area of the band is much more gradual, and therefore easier for the band to absorb and significantly less likely to result in undue aging or breaking of the band. Therefore, a combination of a stepper motor driven pulley and helical band can be expected to have a much longer life than the normally wound bands in present use.

Turning next to FIG. 4, shown therein is a rotary carriage embodying the present invention. More particularly, the recording head or heads 33 are moved relative to a disc 40 for positioning over selected tracks 42. The radial drive, pertinent parts of which are shown in this drawing, includes a first T-shaped arm 44 and a second head carrying arm 46 linked together at a common point 47 so that movement of the arm 44 causes radial movement of the arm 46 to move the head 33 from track to track. The driving force for positioning of the T-shaped arm 44 is provided by a motor 50 mounted with a drive shaft 12 perpendicular to the direction of travel of the head 52 of the T-shaped driving arm. The carriage portion to which the band is connected is curved to match the radius of curvature of the path of travel of head 33 and has the band portions 14A, 14B resting thereon.

As shown herein, a positioning assembly has been provided which is especially useful in a disc drive or the like. Use of this invention provides for an increased number of tracks being recorded on the disc, and for highly accurate positioning of the head in movement across the disc. Further, the life of any machine incorporating this helical band drive is lengthened due to reduced exposure of the band to instantaneous changes in stress.

Other modifications and improvements of the invention disclosed herein may become apparent to one of skill in the art who has reviewed the instant patent application. Therefore the scope of the subject invention is to be limited only by the following claims.

What is claimed is:

1. Positioning apparatus for positioning a magnetic head relative to a recording medium including a head carrying mechanism mounted for rotary movement over said recording medium, a drive arm connected to the head carrying mechanism and rotatable about a pivot point, the distal end of said arm from said pivot point mounting a curved end portion, drive means for rotating said drive arm comprising a drive motor having a drive shaft perpendicular to said recording medium and the direction of travel of the carriage, said drive shaft being mounted just outside the arc of the circle along which said end portion travels and being connected to said end portion for causing movement thereof by flexible band means comprising first and second distinct parallel bands, each having one end connected to said shaft and the other end connected to said end portion of said arm, said bands each being helically wound on and unwound from said shaft for moving said carriage, the bands wrapping on the same angular cross section of a surface area of the motor drive shaft with one band wrapping onto a portion of the pulley surface area adjacent to the portion left vacant by the unwrapping of the other band to move said head over said recording medium, each of the bands defining an acute angle with the pulley with the length of the drive shaft being accordingly minimized, the shaft being permitted to rotate at least 360°.

2. Positioning apparatus as in claim 17 wherein each of said first and second bands is at least as long as the full length of travel of said carriage.

3. Positioning apparatus as in claim 2 including means for fastening one end of each of said bands to said drive shaft, said carriage including notches located on the edges of the carriage aligned with a path of movement of the fastening means to allow the fastening means to clear the carriage as the drive shaft rotates a complete 360°.

4. Positioning apparatus as in claim 1 wherein said drive motor rotates said drive shaft more than 360° to extend the length of the path of travel of the carriage.

5. Positioning apparatus as in claim 4 including means for fastening one end of each of said bands to said drive shaft, and wherein said end portion comprises notches in the outer edges aligned with the fastening means to allow the fastening means to clear the end portion as the drive shaft rotates a complete 360°.

* * * * *

UNITED STATES PATENT AND TRADEMARK OFFICE
CERTIFICATE OF CORRECTION

PATENT NO. : 4,654,736

DATED : March 31, 1987

INVENTOR(S) : Steven Kaczeus, et al.

It is certified that error appears in the above-identified patent and that said Letters Patent is hereby corrected as shown below:

Claim 2, line 1, alter "17" to --1--.

Signed and Sealed this

Twenty-third Day of August, 1988

Attest:

DONALD J. QUIGG

*Attesting Officer*   *Commissioner of Patents and Trademarks*